Patented Mar. 29, 1949

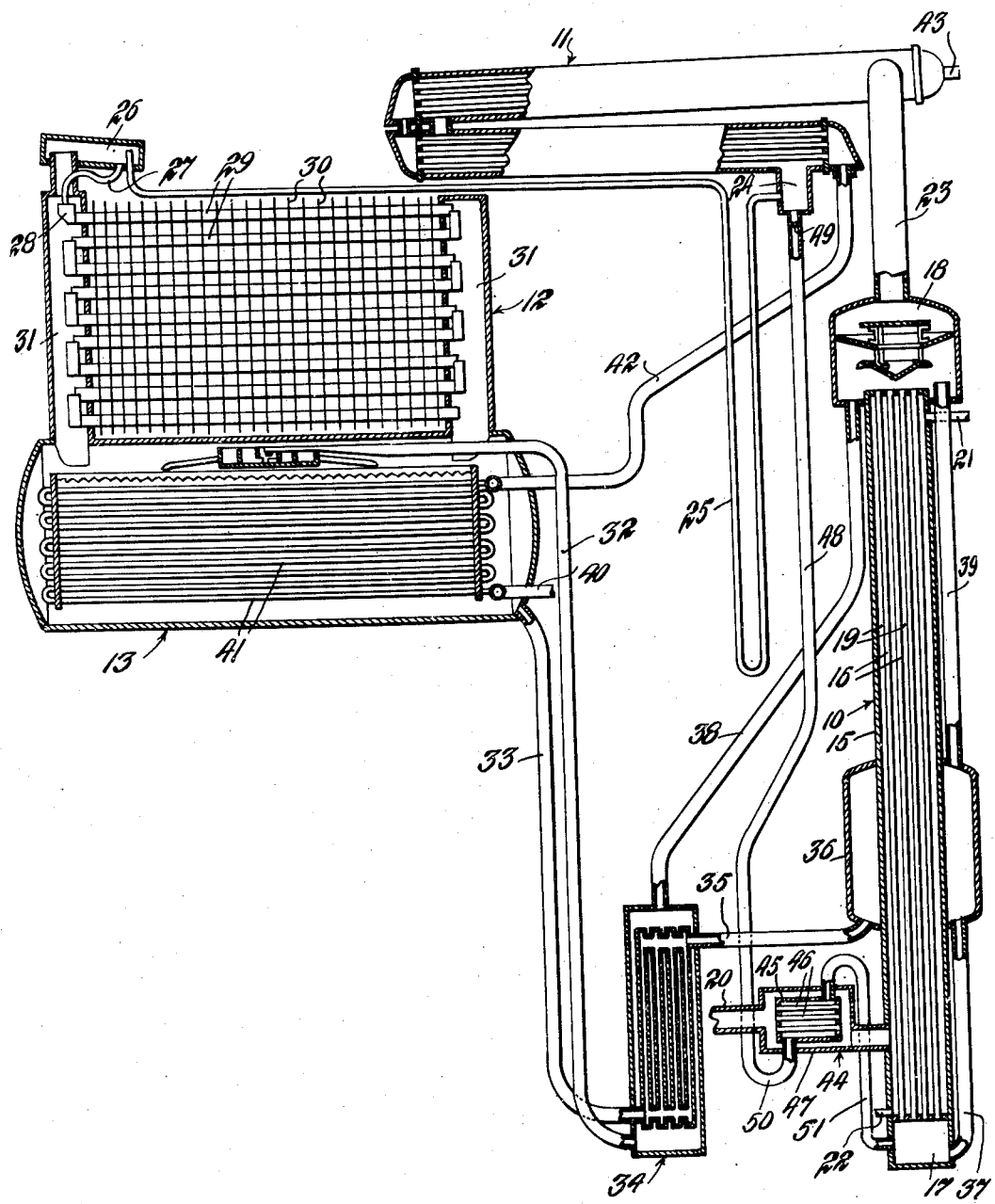

2,465,939

UNITED STATES PATENT OFFICE 2,465,939

REFRIGERATION

Clifford E. Skomp, Evansville, Ind., assignor to Servel, Inc., New York, N. Y., a corporation of Delaware Application March 5, 1947, Serial No. 732,397

10 Claims. (Cl. 62—119)

This invention relates to refrigeration and more particularly to a method of and apparatus for reducing superheat in the vapor expeller of an absorption refrigerating system.

In the operation of absorption refrigerating system, particularly the vacuum or low-pressure type, the refrigerant-absorbent solution in the generator or vapor expeller is often heated beyond its boiling point without its boiling. This superheating of the solution is a nuisance in that it reduces the efficiency of the system and it causes distracting noises. It has been found in practice that a diluted solution, that is, a solution which contains more refrigerant than is normally used, will boil more readily than a solution containing a normal amount of refrigerant. It has also been found that if the solution is preheated before it enters the vapor expeller proper that such preheated solution will boil without appreciable superheat. It has been found further that if the solution in the vapor expeller of an absorption refrigerating system be agitated that such solution will boil more readily than will a quiescent solution.

The principal objects of my invention, therefore, are to provide means: for diluting the refrigerant-absorbent solution in the generator of an absorption refrigerating system during cooling cycle operations and each time the system shuts down; for preheating the solution before it enters the vapor expeller proper; and for agitating the solution in the vapor expeller of such system during normal cooling cycle operations thereof.

The invention, together with the above and other objects and advantages, will be better understood from the following detailed description taken in connection with the accompanying drawing, wherein the single figure diagrammatically illustrates a refrigerating apparatus embodying my invention.

Referring to the drawing, the apparatus shown comprises basically a two-pressure water absorption type refrigerating unit generally as described in United States patent to A. R. Thomas and P. P. Anderson, Jr., No. 2,282,503, granted May 12, 1942. An apparatus of this type operates below atmospheric pressure and includes a generator or vapor expeller 10, a condenser 11, an evaporator 12 and an absorber 13, which are interconnected in such a manner that flow of fluids between the high and low pressure sides of the apparatus is regulated by liquid columns.

The generator 10 includes an outer shell 15 within which are disposed a plurality of vertical riser tubes 16 having the lower ends thereof communicating with an inlet chamber 17 and the upper ends thereof projecting into and above the bottom of a separating vessel 18. A space 19 within shell 15 and about the tubes 16 forms a steam chamber to which steam is supplied through a conduit 20 from any suitable source. The space 19 provides for full length heating of tubes 16, a vent conduit 21 being provided at the upper end of shell 15. The condensate formed in the steam chamber of generator 10 flows therefrom through a conduit 22.

The unit contains a water solution of refrigerant in absorbent liquid such as, for example, a water solution of lithium chloride, lithium bromide or a mixture of the two. With steam supplied through conduit 20 to space 19, heat is applied to tubes 16 whereby water vapor is expelled from solution. The residue absorption solution is raised by gas or vapor-lift action with the expelled water vapor forming a small core within an upwardly rising annulus of the solution. The expelled water vapor rises more rapidly than the solution with the solution flowing along the inside walls of the tubes 16.

The water vapor flows upwardly through the tubes or risers 16 into vessel 18 which serves as a vapor separator. Due to baffling in vessel 18, water vapor is separated from raised absorption solution and flows through a conduit 23 into condenser 11 wherein the vapor is liquefied. The liquid refrigerant formed in condenser 11 flows therefrom into a sump or reservoir 24, to be referred to in more detail hereinafter, and from the sump the liquid refrigerant flows through a U-tube or trap 25 into a flash chamber 26. From the flash chamber, the liquid refrigerant flows through a conduit 27 into a distributing trough 28 and from there into the upper row of tubes 29 of the evaporator 12. The liquid refrigerant flows through the several rows of tubes 29 in series wherein the liquid is vaporized with consequent absorption of heat to produce the desired refrigerating effect which is utilized, in this instance, to cool an air stream flowing over the tubes 29. Tubes 29 are provided with heat transfer fins 30.

The refrigerant vapor formed in the evaporator tubes flows into headers 31 at each end of the evaporator, and from there the vapor flows to the absorber 13, in which the vapor is absorbed by absorption solution which enters the upper part of the absorber through a conduit 32. The absorption solution enriched in refrigerant is conducted from the absorber through a conduit 33, an inner passage in a liquid heat exchanger 34, a conduit 35, a stabilizing vessel 36, and a conduit 37 into the inlet chamber 17 of generator 10. Refrigerant vapor is expelled out of solution in generator 10 by heating, and the solution is raised by gas or vapor-lift action in riser tubes 16, as explained above.

The absorption solution weak in refrigerant which has been lifted in the riser tubes into vessel 18 flows therefrom through a conduit 38, an outer passage in liquid heat exchanger 34, and conduit 32 into the upper part of absorber 13. This circulation of absorption solution results from the raising of solution in riser tubes 16, whereby such solution can flow to the absorber and return from the latter to the generator by force of gravity. The upper part of vessel 36 and the lower part of vessel 18 are connected by a vent conduit 39.

The absorber 13 and condenser 11 constitute heat rejecting parts of the refrigeration apparatus and are cooled by a suitable cooling medium such as water, for example, which is conducted from a suitable source of supply through a conduit 40 to a bank of tubes 41 within the absorber, whereby heat of absorption is given up to the cooling water. The cooling water is conducted from the absorber through a conduit 42 to condenser 11 in which heat of condensation is given up to the cooling water. The cooling water leaves the condenser through a conduit 43.

In accordance with this invention, an auxiliary generator, indicated generally by reference numeral 44, is provided in the conduit 20 which supplies steam to the chamber 19 of the main generator 10. The auxiliary generator, which may be in the form of a conventional shell-and-tube type heat exchanger, includes a shell 45 in which is located a plurality of horizontal tubes 46. As shown, shell 45 is located within an enlarged portion 47 of steam conduit 20. A conduit 48, provided with a metering orifice 49 at its upper end and with a U-trap 50 at its lower end, leads from the bottom of sump 24 to the bottom of shell 45 of the auxiliary generator for flow of liquid refrigerant from the former to the latter. A vapor conduit 51 leads from the top of shell 45 to the inlet chamber 17 of the main generator for flow of vapor from the former to the latter.

In operation, refrigerant vapor is expelled from solution in the main generator, which vapor is liquefied in the condenser and flows into the sump 24, wherein liquid refrigerant accumulates to a point of overflow into trap 25, after which liquid refrigerant flows through trap 25 to the flash chamber and from there into the evaporator, wherein the liquid refrigerant is vaporized producing the desired refrigerating effect, as explained above. A small quantity of liquid refrigerant also flows from the sump 24 through metering orifice 49 and conduit 48 into the bottom of shell 45 of the auxiliary generator. With steam flowing through conduit 20, around the shell and through the horizontal tubes of the auxiliary generator en route to the main generator, liquid refrigerant contained in the auxiliary generator is vaporized, which vapor flows through conduit 51 into the inlet chamber 17 of the main generator. The vapor, upon entering the inlet chamber of the main generator comes in contact with the refrigerant-absorbent solution contained therein, and, since the temperature of this solution is below its boiling point, the vapor condenses giving up its heat of condensation as well as some sensible heat to the solution, whereby the solution is preheated and diluted by the condensate before it enters the riser tubes 16. Also, the condensing of vapor in the inlet chamber of the main generator causes the solution contained therein and in the lower portions of the riser tubes to be agitated. In this manner, the solution in the inlet chamber and in the lower portions of the riser tubes is continuously agitated, preheated and diluted, whereby superheating of the solution in the riser tubes is appreciably reduced.

Metering orifice 49 and the auxiliary generator 44 are so designed that during cooling cycles of operation liquid refrigerant stands in conduit 48 to a level such that the hydrostatic head of this column of liquid is greater than the hydrostatic head of solution in the main generator by such an amount that sufficient pressure is maintained in the auxiliary generator to insure flow of refrigerant vapor through conduit 51 into the inlet chamber of the main generator. It is to be noted, that the amount of liquid refrigerant which passes through the metering orifice and is vaporized in the auxiliary generator is so small in comparision with the amount of liquid refrigerant that flows through trap 25 into the evaporator 12, that the overall efficiency of the unit is not appreciably reduced.

Each time the unit shuts down, and the pressures in the main generator, condenser and auxiliary generator equalize, the liquid refrigerant in conduit 48 will seek the level of the solution in the main generator, whereupon liquid refrigerant, along with the accumulated liquid refrigerant in sump 24, flows through conduit 48 into the auxiliary generator, and from there the liquid flows through conduit 51 into the inlet chamber of the main generator. In this manner, the refrigerant-absorbent solution in the inlet chamber and in the lower portions of the riser tubes of the main generator is appreciably diluted each time the unit shuts down, so that when the unit is again started up the solution in the main generator boils quietly and without appreciable superheat. It will, therefore, be seen that my invention provides improved means for reducing superheat in the generator of an absorption refrigerating system at the beginning of each cooling cycle of operation as well as during each cooling cycle of operation.

Having thus described my invention, I wish it to be understood that I do not desire to be limited to the exact details of construction shown and described, for obvious modifications will occur to a person skilled in the art.

What is claimed is:

1. An absorption refrigerating apparatus including a main generator, a condenser, an evaporator, an absorber and conduits interconnecting said elements for flow of a refrigerating medium and an absorption solution, said main generator including an inlet chamber for receiving a refrigerant-absorbent solution from said absorber and a plurality of riser tubes in open communication with said inlet chamber, means for applying a heating medium to said riser tubes whereby refrigerant vapor is expelled from refrigerant-absorbent solution contained therein, an auxiliary generator, means for applying heat to said auxiliary generator, a conduit connected between the condenser and the auxiliary generator for flow of liquid refrigerant therethrough, and a conduit connected between the auxiliary generator and the inlet chamber of the main generator for flow of fluid from the former to the latter.

2. An absorption refrigerating apparatus including a main generator, a condenser, an evaporator, an absorber and conduits interconnecting said elements for flow of a refrigerating medium and an absorption solution, said main generator including an inlet chamber for receiving a refrigerant-absorbent solution from said absorber and a plurality of riser tubes in open communication with said inlet chamber, means for applying a heating medium to said riser tubes whereby refrigerant vapor is expelled from refrigerant-absorbent solution contained therein, an auxiliary generator, means for applying heat to the auxiliary generator, a reservoir connected to said condenser to receive liquid refrigerant therefrom, a conduit connecting said reservoir and said auxiliary generator for flow of liquid refrigerant therethrough, means in said last-named conduit for metering the flow of liquid refrigerant therethrough, and a conduit connected between the auxiliary generator and the inlet chamber of the main generator for flow of fluid from the former to the latter.

3. An absorption refrigerating apparatus including a main generator, a condenser, an evaporator, an absorber and conduits interconnecting said elements for flow of a refrigerating medium and an absorption solution, said main generator including an inlet chamber for receiving a refrigerant-absorbent solution from said absorber and a plurality of riser tubes in open communication with said inlet chamber, means for applying a heating medium to said riser tubes whereby refrigerant vapor is expelled from refrigerant-absorbent solution contained therein, an auxiliary generator, means for applying heat to said auxiliary generator, a reservoir in the conduit connecting the condenser and evaporator, a conduit connecting said reservoir and the auxiliary generator for flow of liquid refrigerant from the former to the latter, means in said last-named conduit for dividing liquid refrigerant between the evaporator and the auxiliary generator, and a conduit connected between the auxiliary generator and the inlet chamber of the main generator for flow of refrigerant vapor from the former to the latter.

4. An absorption refrigerating apparatus including a main generator, a condenser, an evaporator, an absorber and conduits interconnecting said elements for flow of a refrigerating medium and an absorption solution, a conduit for supplying steam to said main generator to expel refrigerant vapor from a refrigerant-absorbent solution contained therein, an auxiliary generator, means for heating said auxiliary generator, a conduit connected between the condenser and the auxiliary generator for flow of liquid refrigerant from the former to the latter, means in said last-named conduit for controlling the flow of liquid therethrough, and a conduit connected between said auxiliary generator and a lower portion of said main generator, the construction and arrangement being such that when steam is supplied to said main generator refrigerant vapor is expelled from the solution contained therein, which vapor is liquefied in the condenser and flows therefrom in part to said auxiliary generator wherein the liquid is vaporized, which vapor flows into the lower portion of the main generator to preheat, dilute and agitate solution contained therein.

5. An absorption refrigerating apparatus including a main generator, a condenser, an evaporator, an absorber and conduits interconnecting said elements for flow of a refrigerating medium and an absorption solution, a conduit for supplying steam to said main generator to expel refrigerant vapor from a refrigerant-absorbent solution contained therein, an auxiliary generator within said steam conduit, a conduit connected between the condenser and the auxiliary generator for flow of liquid refrigerant from the former to the latter, means in said last-named conduit for controlling the flow of liquid therethrough, and a conduit connected between said auxiliary generator and a lower portion of said main generator, the construction and arrangement being such that when steam is supplied to said main generator refrigerant vapor is expelled from the generator and the solution contained therein, which vapor is liquefied in the condenser and a portion of which flows to said auxiliary generator wherein the liquid is vaporized, which vapor flows into the lower portion of the main generator to preheat, dilute and agitate the solution contained therein, whereas, when the supply of steam to the main generator is discontinued, liquid refrigerant flows from the auxiliary generator into the lower portion of the main generator further diluting the solution contained therein.

6. An absorption refrigerating apparatus including a main generator, a condenser, a reservoir, an evaporator, an absorber and conduits interconnecting said elements for flow of a refrigerating medium and an absorption solution, a conduit for supplying steam to said generator to expel refrigerant vapor from a refrigerant-absorbent solution contained therein, an auxiliary generator within said steam conduit, a conduit connected between said reservoir and said auxiliary generator for flow of liquid refrigerant from the former to the latter, means in said last-named conduit for controlling the flow of liquid therethrough, and a conduit connected between said auxiliary generator and a lower portion of said main generator, the construction and arrangement being such that when steam is supplied to said main generator refrigerant vapor is expelled from solution contained therein, which vapor is liquefied in the condenser and flows therefrom into the reservoir from whence part of the liquid flows to said auxiliary generator wherein the liquid is vaporized, which vapor flows into the lower portion of the main generator to preheat and agitate solution contained therein, whereas, when the supply of steam to the main generator is discontinued, liquid refrigerant flows from the reservoir through the auxiliary generator into the lower portion of the main generator diluting the solution contained therein.

7. In the art of refrigeration through the agency of an absorption refrigerating system including a main generator, a condenser, an evaporator, an absorber, an auxiliary generator and conduits interconnecting said elements for flow of a refrigerating medium and an absorption solution, that improvement which comprises heating the main generator whereby refrigerant vapor is expelled from a refrigerant-absorbent solution contained therein, flowing the expelled vapor to the condenser wherein the vapor is liquefied, flowing a portion of the liquid refrigerant from the condenser to the evaporator wherein this liquid refrigerant is vaporized to produce cooling, flowing another portion of the liquid refrigerant from the condenser to the auxiliary generator, heating the auxiliary generator whereby the liquid refrigerant contained therein is vaporized, and preheating and agitating refrigerant-absorbent solution by flowing the vapor produced in the auxiliary generator in intimate contact with such solution as the solution enters the main generator.

8. In the art of refrigeration through the agency of an absorption refrigerating system including a main generator, a condenser, an evaporator, an absorber, an auxiliary generator and conduits interconnecting said elements for flow of a refrigerating medium and an absorption solution, that improvement which comprises flowing a heating medium to the main generator whereby refrigerant vapor is expelled from a refrigerant-absorbent solution contained therein, flowing the expelled vapor to the condenser wherein the vapor is liquefied, flowing the liquid refrigerant to a place of storage, flowing a portion of the liquid refrigerant from the place of storage to the evaporator wherein this liquid refrigerant is vaporized to produce cooling, flowing another portion of the liquid refrigerant from the place of storage to the auxiliary generator wherein this portion of the liquid refrigerant is vaporized by the heating medium flowing to the main generator, and flowing the vapor produced in the auxiliary generator into a lower portion of the main generator wherein said vapor preheats, dilutes and agitates the refrigerant-absorbent solution contained therein.

9. In the art of refrigeration through the agency of an absorption refrigerating system including a main generator, a condenser, an evaporator, an absorber, an auxiliary generator and conduits interconnecting said elements for flow of a refrigerating medium and an absorption solution, that improvement which comprises flowing a heating medium to the main generator whereby refrigerant vapor is expelled from a refrigerant-absorbent solution contained therein, flowing the expelled vapor to the condenser wherein the vapor is liquefied, flowing the liquid refrigerant from the condenser to a place of storage, flowing a portion of the liquid refrigerant from the place of storage to the evaporator wherein this liquid refrigerant is vaporized to produce cooling, flowing another portion of the liquid refrigerant from the place of storage to the auxiliary generator wherein this portion of the liquid refrigerant is vaporized by the heating medium flowing to the main generator, flowing the vapor produced in the auxiliary generator into a lower portion of the main generator wherein said vapor preheats and agitates the refrigerant-absorbent solution contained therein, discontinuing the flow of heating medium to said main generator, and flowing liquid refrigerant from the place of storage into the lower portion of the main generator whereby the refrigerant-absorbent solution contained therein is diluted.

10. A method of reducing superheat in a vapor expeller of an absorption refrigerating system and thereby promote quiet boiling of solution which comprises, applying heat to the vapor expeller, whereby vapor is expelled from a refrigerant-absorbent solution contained therein, preheating and agitating refrigerant-absorbent solution flowing into a lower portion of the vapor expeller by flowing vapor in intimate contact with such solution before the solution reaches a vaporizing space of the vapor expeller, discontinuing the application of heat to the vapor expeller, whereby the pressure therein is reduced, and flowing liquid refrigerant into the lower portion of the vapor expeller responsive to the reduction of pressure therein, whereby the refrigerant-absorbent solution in the lower portion of the vapor expeller is diluted.

CLIFFORD E. SKOMP.

REFERENCES CITED

The following references are of record in the file of this patent:

UNITED STATES PATENTS

| Number | Name | Date |
|---|---|---|
| 2,399,922 | Grossman | May 7, 1946 |